US012684660B2

(12) United States Patent
Huisseune

(10) Patent No.: US 12,684,660 B2
(45) Date of Patent: Jul. 14, 2026

(54) COOKING ASSEMBLY

(71) Applicant: NOVY INVEST, Kuurne (BE)

(72) Inventor: Henk Huisseune, Melle (BE)

(73) Assignee: NOVY NV, Kuurne (BE)

( * ) Notice: Subject to any disclaimer, the term of this patent is extended or adjusted under 35 U.S.C. 154(b) by 651 days.

(21) Appl. No.: 18/036,974

(22) PCT Filed: Nov. 15, 2021

(86) PCT No.: PCT/EP2021/081628

§ 371 (c)(1),
(2) Date: May 15, 2023

(87) PCT Pub. No.: WO2022/101462

PCT Pub. Date: May 19, 2022

(65) Prior Publication Data

US 2023/0422360 A1 Dec. 28, 2023

(30) Foreign Application Priority Data

Nov. 16, 2020 (BE) .................................. 2020/5823

(51) Int. Cl.
*H05B 6/12* (2006.01)

(52) U.S. Cl.
CPC .................................. *H05B 6/1281* (2013.01)

(58) Field of Classification Search
CPC ...... H05B 6/1281; H05B 6/065; H05B 6/062; H05B 6/1272; H05B 3/74; H05B 6/1209; H05B 3/685

(Continued)

(56) References Cited

U.S. PATENT DOCUMENTS 5,686,006 A * 11/1997 Gaspard ............... H05B 6/1254 219/622
5,973,303 A * 10/1999 Kuse .................... H05B 6/1209 219/622
6,080,975 A * 6/2000 Kuse ...................... H05B 6/062 219/622

FOREIGN PATENT DOCUMENTS

| | | |
|---|---|---|
| CN | 206522813 U | 9/2017 |
| DE | 3808756 A1 | 9/1989 |

(Continued)

OTHER PUBLICATIONS

International Search Report and Written Opinion for corresponding PCT Patent Application No. PCT/EP2021/081628, mailed Feb. 8, 2022 (11 pages).

*Primary Examiner* — Phuong T Nguyen
(74) *Attorney, Agent, or Firm* — Womble Bond Dickinson (US) LLP

(57) ABSTRACT

A cooking assembly comprising a countertop (6) and an induction cooking device (1) attached to the bottom (8) of the countertop (6). The induction cooking device comprises: an induction coil formed from a wire having a substantially uniform non-circular cross-section which is higher than it is wide and which is at a distance ($d_6$) from a top surface (7) of the countertop between 10 and 50 mm, said induction coil having an outer diameter and an inner diameter which is at least equal to 40% of said outer diameter; a generator (15, 16) configured to supply an AC current to the induction coil with a frequency between 30 and 80 kHz; and a magnetic flux concentrator disposed underneath the induction coil and covering at least 50% of the bottom of the induction coil and having a relative magnetic permeability of at least 1000.

14 Claims, 3 Drawing Sheets

(58) Field of Classification Search
USPC ................ 219/600, 620, 622, 623, 624, 627
See application file for complete search history.

(56) References Cited

FOREIGN PATENT DOCUMENTS

| | | | | |
|---|---|---|---|---|
| DE | 10 2015 220 795 A1 | | 6/2016 | |
| EP | 2 876 975 A1 | | 5/2015 | |
| EP | 3 032 917 A1 | | 6/2016 | |
| ES | 2 455 442 A1 | | 4/2014 | |
| JP | 2006-230517 A1 | | 9/2006 | |
| WO | WO 97/30567 A1 | | 8/1997 | |
| WO | WO 98/41064 A1 | | 9/1998 | |
| WO | WO-2005043960 A1 | * | 5/2005 | ........... H05B 6/1245 |
| WO | WO 2011/128799 A1 | | 10/2011 | |
| WO | WO 2012/098262 A1 | | 7/2012 | |
| WO | WO 2014/108521 A1 | | 7/2014 | |
| WO | WO 2019/130180 A1 | | 7/2019 | |
| WO | WO 2020/034011 A1 | | 2/2020 | |

* cited by examiner

COOKING ASSEMBLY

CROSS-REFERENCE TO RELATED APPLICATIONS

This application is a National Phase Patent Application and claims priority to and the benefit of International Patent Application No. PCT/EP2021/081628, filed on Nov. 15, 2021, which claims priority to and the benefit of Belgian Patent Application No. 6E2020/5823, filed on Nov. 16, 2020. The entire contents of both of which are incorporated herein by reference.

TECHNICAL FIELD

The present invention relates to a cooking assembly comprising a countertop and an induction cooking device to be mounted underneath the countertop.

BACKGROUND ART

Induction cooking devices are known and usually comprise a frame supporting an induction coil that acts as an inductor. A generator is provided to supply an AC current to the induction coil and a magnetic flux concentrator, typically made from ferrite, is provided underneath the induction coil. An example of magnetic flux concentrator for an induction cooking device is disclosed in EP 2 876 975 A1. A cooking worktop in the form of a glass-ceramic plate is typically provided on top of the induction cooking device. This glass-ceramic plate is then inserted into an opening of a traditional countertop (for example made from natural stone, such as granite or marble, laminate materials, composite materials, etc.). The AC current in the induction coil generates a magnetic field that generates eddy currents in the bottom of an electrically conductive container (i.e. a cooking pot) placed on top of the cooking worktop. The distance between the top surface of the induction coil and the cooking surface (i.e. the top surface of the glass-ceramic plate) is usually about 4 mm to 6 mm. Such an induction cooking device is, for example, disclosed in WO 2005/043960 A1.

Various disclosures have already been made relating to so-called invisible induction cooking assemblies. More specifically, in these disclosures, the countertop is continuous and no opening is provided for the glass-ceramic cooking worktop. Examples may be found in WO 97/30567 A1, WO 98/41064 A2, U.S. Pat. No. 6,080,975 A, WO 2014/108521 A1, and EP 3032917 A1. A common problem for invisible induction cooking assemblies is the efficiency of the energy transfer from the induction coil to the cooking pot placed on the cooking surface. Naturally, a cooking pot is also meant to include pans and other common cooking containers. More specifically, in invisible induction cooking assemblies, the distance between the induction coil and the cooking surface may be of the order of 6 to 50 mm depending on the countertop design, which distance is larger compared to conventional induction cooking devices having a glass-ceramic top plate. The increase of this distance negatively affects the efficiency of the energy transfer.

In order to alleviate this problem, the known invisible induction cooking assemblies rely on providing one or more recesses in the bottom side of the countertop with the induction cooking devices then being placed in these recesses. The recesses allow to decrease the distance between the cooking surface and the induction coil in the induction cooking device to improve the energy transfer from the induction coil to the cooking pot placed on the cooking surface. An alternative solution is to rely on very thin countertops (e.g. countertops having a thickness of 6 or 8 mm). However, this requires an additional supporting frame underneath the countertop in order to provide the required strength for the countertop.

A downside of the known invisible induction cooking assemblies is that the recesses structurally weaken the countertop and/or an additional supporting frame is required which is undesired. Moreover, this also limits the size and/or number of induction cooking devices that may be provided in the cooking assembly.

Another downside of the known invisible induction cooking assemblies is that the heat generated within the cooking pot may negatively affect the countertop, causing e.g. a rupture of the countertop. A known solution to this problem is to provide a thermal insulation layer between the countertop and the cooking pot, which layer also avoids direct contact. Examples are disclosed in WO 2012/98262 A1, ES 2455442 A1, WO 2019/130180 A1, and WO 2020/34011 A1. However, the use of additional layers is cumbersome and increases the overall cost of the induction cooking assembly.

Another solution is the use of feet under the cooking pot to have an air space between the countertop and the cooking pot thus causing a thermal insulation layer. However, this requires dedicated cooking pots for the invisible induction cooking assembly which is undesired.

Yet another solution to avoid damaging the countertop is to limit the induction power, e.g. a maximum power equal to 3000 W, or to only allow high induction powers for a limited time (e.g. 3700 W for only a few seconds). However, this also limits the maximal obtained cooking temperatures which then typically remain below 200° C., which temperatures are not sufficient to prepare some specific dishes.

DISCLOSURE OF THE INVENTION

It is an object of the present invention to provide an induction cooking device that may be placed underneath a countertop without having to structurally weaken the countertop.

This object is achieved according to the invention with a cooking assembly comprising a countertop and an induction cooking device to be mounted underneath the countertop, the induction cooking device comprising: a frame; an induction coil supported by the frame and having a bottom and a top, the top being oriented towards the countertop and being positioned at a first distance from a top surface of the countertop, the first distance being between 10 and 50 mm, the induction coil being formed from a wire having a substantially uniform non-circular cross-section having a width and a height, the height being larger than the width, said induction coil having an inner diameter and an outer diameter, said inner diameter being at least equal to 40% of said outer diameter; a generator connected to the induction coil and configured to supply an AC current to the induction coil, the AC current having a frequency between 25 and 80 kHz; and a magnetic flux concentrator disposed between the frame and the bottom of the induction coil, the magnetic flux concentrator covering at least 50% of the bottom of the induction coil and having a relative magnetic permeability of at least 1000.

As opposed to prior art solutions for invisible induction cooking devices which rely on modifying the countertop to minimize the air gap between the induction coil and the cooking pot, the present invention relies on modifying the properties of the magnetic fields generated by the induction coil.

More specifically, the present inventors have found that an induction cooking device having (as compared to known induction cooking devices) coil windings which are closer together (due to their non-circular cross-section) which maximizes their mutual inductance, an increased frequency of the AC current, and an increased reluctance of the magnetic flux concentrator results in a generated magnetic field that is able to transfer energy to locations further away from the induction coil. In particular, the induction cooking device is able to effectively transfer sufficient energy to heat a cooking pot located 20 mm or more away from the induction coil.

More specifically, the induction coil is provided with a constant power (e.g. 230 V) and by placing an electrically conductive cooking pot above the induction coil, the electrical conductivity of the cooking pot is seen by the coil like a serial resistance R. This resistance is important to effectively transfer the power to the cooking pot. If the resistance is too low, the current is too high and needs to be limited and, if the resistance is too high, the current is to low and an insufficient power is generated. When increasing the distance between the cooking pot and the inductive coil, the inventors have found that the following effects occur:

a lower magnetic coupling with the cooking pot and thus a lower resistance as seen by the coil; and an increase of coupling with other materials and/or components for which the distance has not changed (e.g. an aluminium frame underneath the coil).

In order to counter these effects, the present inventors have found that, in order to effectively transfer the power at a greater distance, the resistance value of the cooking pot as seen from the inductive coil needs to remain as constant as possible. This has been achieved by:

increasing the working frequency of the generator; and increasing the magnetic coupling by placing the winding of the coil closer together and by modifying the magnetic flux concentrator.

As such, the induction cooking device used in the cooking assembly according to the present invention may be attached to the bottom side of a countertop and is able to effectively provide sufficient energy to the cooking pot even with an air gap (i.e. the distance between the bottom of the cooking pot and the induction coil) of 20 mm and more. There is thus no longer a need to provide recesses in the bottom of the countertop or otherwise structurally weaken the countertop in order to decrease the air gap.

It will be readily appreciated that the quality of the cooking pot and/or the desired cooking temperature affects the required AC current such that, in certain specific instances, a frequency below 25 kHz may also be sufficient (in combination with the other measures according to the present invention) to effectively provide sufficient energy to the cooking pot even with an air gap of 20 mm and more. In other words, the induction cooking device used in the cooking assembly according to the present invention does not always have to continuously operate with a frequency between 25 kHz and 80 kHz.

In an embodiment of the present invention said induction coil has an inner diameter and an outer diameter, said inner diameter being at most equal to 75%, in particular at most 60%, and more in particular at most 50%, of said outer diameter.

The present inventors have found that an inner coil diameter between 40-50% of the outer coil diameter provides an optimum balance between contradicting parameters. On the one hand, the inner coil diameter may not be too large as there are otherwise insufficient windings thus decreasing the overall magnetic field strength. Moreover, this may also affect thermal distribution in the cooking pot. On the other hand, the inner coil diameter may not be too small since the magnetic field strength (e.g. at a distance of 20 mm from the coil along the axis of the coil) is also proportional to the inner coil diameter for a same number of windings. An inner coil diameter between 40-50% of the outer coil diameter has been found to provide a sufficient magnetic field strength.

Another advantage of the increased inner diameter relates to the countertop. As described below, in a preferred embodiment, there is a central opening in the countertop to provide a temperature sensor. However, this opening is a local weakening of the countertop. Due to the increased inner diameter of the coil, the heating near the countertop opening is slower and temperature remains somewhat lower when compared to the countertop area directly above the induction coil. This lower temperature aids in avoiding that ruptures occur (due to the heat generated) near the locally weakened countertop. Moreover, the increased inner diameter also results in a weaker magnetic field in the central area thus reducing the risk that currents are induced in the temperature sensor and/or cables attached thereto, which could result in inaccurate temperature readings.

In an embodiment of the present invention the magnetic flux concentrator covers at least 70%, particularly at least 80%, and more particularly at least 90%, of the bottom of the induction coil and/or the magnetic flux concentrator has a relative magnetic permeability of at least 1600, particularly at least 2100, more particularly at least 2400, and most particularly at least 2600. Preferably, the magnetic flux concentrator covers substantially the entire bottom of the induction coil.

By increasing the coil area covered by the magnetic flux concentrator and/or increasing the relative magnetic permeability, the reluctance of the magnetic flux concentrator is increased such that a larger part of the generated magnetic field is directed upwards (i.e. away from the frame and towards the cooking pot) thus improving the energy transfer to the cooking pot. Moreover, this also reduces the magnetic flux directed downwards (i.e. towards the frame which is typically made from aluminium). As such, eddy current losses in the aluminium frame are also reduced due to the coverage of the magnetic flux concentrator.

In an embodiment of the present invention the magnetic flux concentrator is formed by a substantially flat disc which is preferably formed from a plurality of circle sectors or by a substantially flat annulus which is preferably formed from a plurality of annulus sectors.

These alternative options increase the flexibility when designing the induction cooking device. Moreover, a substantially flat surface limits the total height of the induction cooking device which is beneficial as this leaves more room to provide storage space underneath. Furthermore, using multiple individual segments typically reduces the cost of the magnetic flux concentrator since large ferrite elements are more expensive to manufacture when compared to small ferrite elements.

In a preferred embodiment of the present invention an inner diameter of said annulus is at most equal to the inner diameter of the induction coil and an outer diameter of said annulus being at least equal to the outer diameter of the induction coil. Preferably the inner diameter of said annulus is at least equal to 10% in particular at least 25%, more in particular at least 40%, and most in particular at least 60%, of the inner diameter of the induction coil, and is at most equal to 90%, in particular at most 80%, more in particular at most 75%, and most in particular at most 70%, of the inner diameter of the induction coil. Preferably, the outer diameter of the magnetic flux concentrator is at least 5% larger than and more preferably at least 10% larger than the outer diameter of the coil.

Since the generated magnetic field is concentrated within the coil (i.e. in the area within the inner coil diameter), it is advantageous to also use the magnetic flux concentrator to cover the inner coil area in order to direct an even larger part of the magnetic field upwards. Moreover, extending the magnetic flux concentrator beyond the coil also results in direction an even larger part of the magnetic field upwards, thus improving the coupling with the cooking pot.

In an embodiment of the present invention the magnetic flux concentrator comprises a soft magnetic material, preferably a ferrite.

Soft magnetic materials, in particular ferrites, are well-known materials used in magnetic flux concentrators. The advantages of these materials are therefore considered well known to the skilled person. In particular, ferrites behave well under high temperatures which may occur in induction cooking applications.

In an embodiment of the present invention the AC current has a frequency of at most 60 kHz, and particularly at most 50 kHz and/or at least 30 kHz.

Reducing the upper limit of the frequency is beneficial as the generator design becomes less complex and/or less costly. More specifically, the generator is typically a resonant invertor which relies on the use of resonant capacitors which are complex and expensive in order to obtain these very high frequencies. Moreover, increasing the frequency increases the resistance as seen by the coil.

In an embodiment of the present invention the induction cooking device further comprises an insulating sheet disposed on top of the induction coil and/or a further insulating sheet disposed on the bottom of the induction coil. In particular, the insulating sheet and/or the further insulating sheet substantially covers the induction coil and preferably also covers the magnetic flux concentrator. Preferably, the insulating sheet and/or the further insulating sheet comprises mica.

These insulating sheets aid in avoiding eddy currents being generated in unwanted components (e.g. the frame) and/or act as an electrical insulation and/or aid in providing a thermal insulation.

In an embodiment of the present invention the wire has a rectangular cross-section. This allows maximizing the closeness of the wires, in particular by placing the straight sides in direct contact with one another.

In an embodiment of the present invention the first distance is at least 12 mm, in particular at least 16 mm, and more in particular at least 18 mm and/or the first distance is at most 40 mm, in particular at most 30 mm, more in particular at most 25 mm, and most in particular at most 22 mm.

The present inventors have found that, based on the design of the induction cooking device according to the present invention, the air gap between the coil and the top surface of the countertop is ideally between 18 and 22 mm. With a larger air gap, the coupling between the induction coil and the cooking pot is lower thus causing a slower heating of the cooking pot. Moreover, this may also cause issues with high currents in the generator in case this is based on a resonant invertor. With a smaller air gap, the overall coupling between the induction coil and the cooking pot is higher and may lead to a too fast heating of the cooking pot which may lead to unsafe situations (e.g. a cooking pot which may become hotter than legally allowed).

In an embodiment of the present invention the countertop has a nearly constant thickness. In other words, the overall structural integrity of the countertop is uniform.

In an embodiment of the present invention countertop comprises a heat resistant material, such as porcelain, ceramic, glass, or a sintered material. It has been found that such materials are able to withstand the heat conduction from the cooking pot without being damaged. As used herein, a heat resistant material should be able to withstand a contact temperature (i.e. be in contact with a cooking pot having a temperature) of at least 230° C., preferably at least 240° C., more preferably at least 260° C. and most preferably at least 300° C. This ensures that the countertop can withstand the temperatures typically achieved in common cooking application. This typically excludes composite materials as the resins used therein are unable to withstand temperatures exceeding 180° C. Preferably, the countertop comprises a ceramic material or a sintered material, such as sintered stone.

In an embodiment of the present invention the induction cooking device further comprises a temperature sensing system configured to sense a temperature of a cooking pot positioned on the countertop, the temperature sensing system comprising: an opening extending through the countertop; a support having a proximal end and a distal end and extending through said opening, the distal end being near a top surface of the countertop; and a temperature sensor positioned near the distal end of the support. In particular, a distance between the top of the induction coil and the distal end of the support is substantially the same as said first distance.

A temperature sensing system is beneficial as it allows to monitor the cooking pot temperature. In this way, legally imposed safety conditions (e.g. a maximal temperature of the cooking pot of 260° C.) may be monitored. Moreover, this also allows monitoring of the heating of the countertop in order to avoid damaging the countertop (e.g. a rupture or crack). In particular, the temperature sensor monitors the cooking pot temperature which is used as an indirect measure of the local countertop temperature.

In a conventional glass-ceramic induction cooking device, a temperature sensor is disposed immediately below and in contact with the glass-ceramic plate and measures the temperature at the bottom side of the glass-ceramic plate. An algorithm controls temperature slopes and absolute temperatures from a safety point of view (e.g. to avoid dry cooking and/or too high temperatures).

The present inventors have realized that, for a countertop that may have a thickness of 10 mm or more, the heat from the cooking pot has much more opportunity to dissipate. As such, the temperature at the bottom side of the countertop may be too inaccurate to estimate the cooking pot temperature. Moreover, the temperature at the bottom side of the countertop may also react only very slowly to a corresponding change in cooking pot temperature such that safety limits may have already been crossed without the countertop indicating this.

Therefore, the present inventors have designed a support for the temperature sensor, which support is to be placed in a corresponding opening through the countertop. In this way, the temperature sensor may be mounted close to (e.g. immediately below) the cooking pot to accurately monitor the cooking temperature. Moreover, temperature detection and control is much faster and more accurate compared to the use of a conventional glass ceramic plate since the support and the opening enable placing the temperature sensor in direct contact with the cooking pot (i.e. in case the distance between the induction coil and the distal end of the support is substantially the same as the distance between the induction coil and the top surface of the countertop) or at least much closer to the cooking pot compared to the glass-ceramic temperature sensor position.

In a preferred embodiment of the present invention the proximal end is supported by the frame. Alternatively, the proximal end is connected to the bottom surface of the countertop. Alternatively, the support is glued, screwed and/or press fitted into the opening. These alternative options allow for a flexible design of the temperature sensor support.

In a preferred embodiment of the present invention the temperature sensing system further comprises a cover disposed on the distal end of the support and covering the temperature sensor.

Such a cover acts as an additional protection for the temperature sensor.

In a more preferred embodiment of the present invention the cover at least partly protrudes with respect to the top surface of the countertop. Preferably, at least one resilient member is positioned between the cover and the support and in particular between the temperature sensor and the support with the cover preferably being fixedly positioned on the temperature sensor. Alternatively, the resilient member is positioned between the temperature sensor and the support with the cover being fixed to the countertop. Furthermore, the resilient member is placed between the frame and the support.

Having the cover protruding above the top surface of the countertop ensures that the cover is always in direct contact with the bottom of the cooking pot. In particular, the bottom of the cooking pot is not always perfectly flat but may exhibit (either accidentally or by design) imperfections and/or curved surfaces. Having the cover protruding from the top surface of the countertop acts to counteract such imperfections and/or curves. Moreover, besides a temperature sensor, alternatively and/or additionally a weight sensor may be added under the cover. This would allow accurate weight determination of the cooking pot and/or its content.

Moreover, the resilient member allows the cover to become depressed due to the weight of a cooking pot thus avoiding that the cover would act as a supporting surface for the cooking pot. The resilient member may be placed between the support and the temperature sensor such that the temperature sensor moves upwards and/or downwards together with the cover thus keeping the distance between the temperature sensor and the cooking pot at a fixed minimal distance (the minimal distance corresponding, for example, to the thickness of the cover). Alternatively, in case the cover is fixed to the countertop, the resilient member ensures that the temperature sensor is contacting the protective cover.

Furthermore, when the resilient member is placed between the frame and the support, a compression spring may be used as a resilient member. A compression spring usually has a lower manufacturing tolerance than a foam or rubber ring which is typically used as a resilient member between the support and the temperature sensor or the cover. Moreover, a metal compression spring is preferably not placed in contact with the temperature sensor as this could acts as a heatsink which could negatively affect the temperature measurements.

In a preferred embodiment of the present invention the countertop extends radially outwards with respect to the induction coil over a distance of at least 3 cm, particularly at least 6 cm, more particularly at least 10 cm, and most particularly at least 15 cm.

Ideally the countertop is as small as possible around the induction coil so as to allow placing the induction coil near an end of the countertop. However, the inventors have realized that the risk of damaging the countertop due to heating increases when the countertop area surrounding the induction coil is decreased. The temperature sensing system is especially beneficial in this embodiment as an accurate temperature control allows reducing the countertop area.

BRIEF DESCRIPTION OF THE DRAWINGS

The invention will be further explained by means of the following description and the appended figures.

DESCRIPTION OF THE INVENTION

Figure 1:
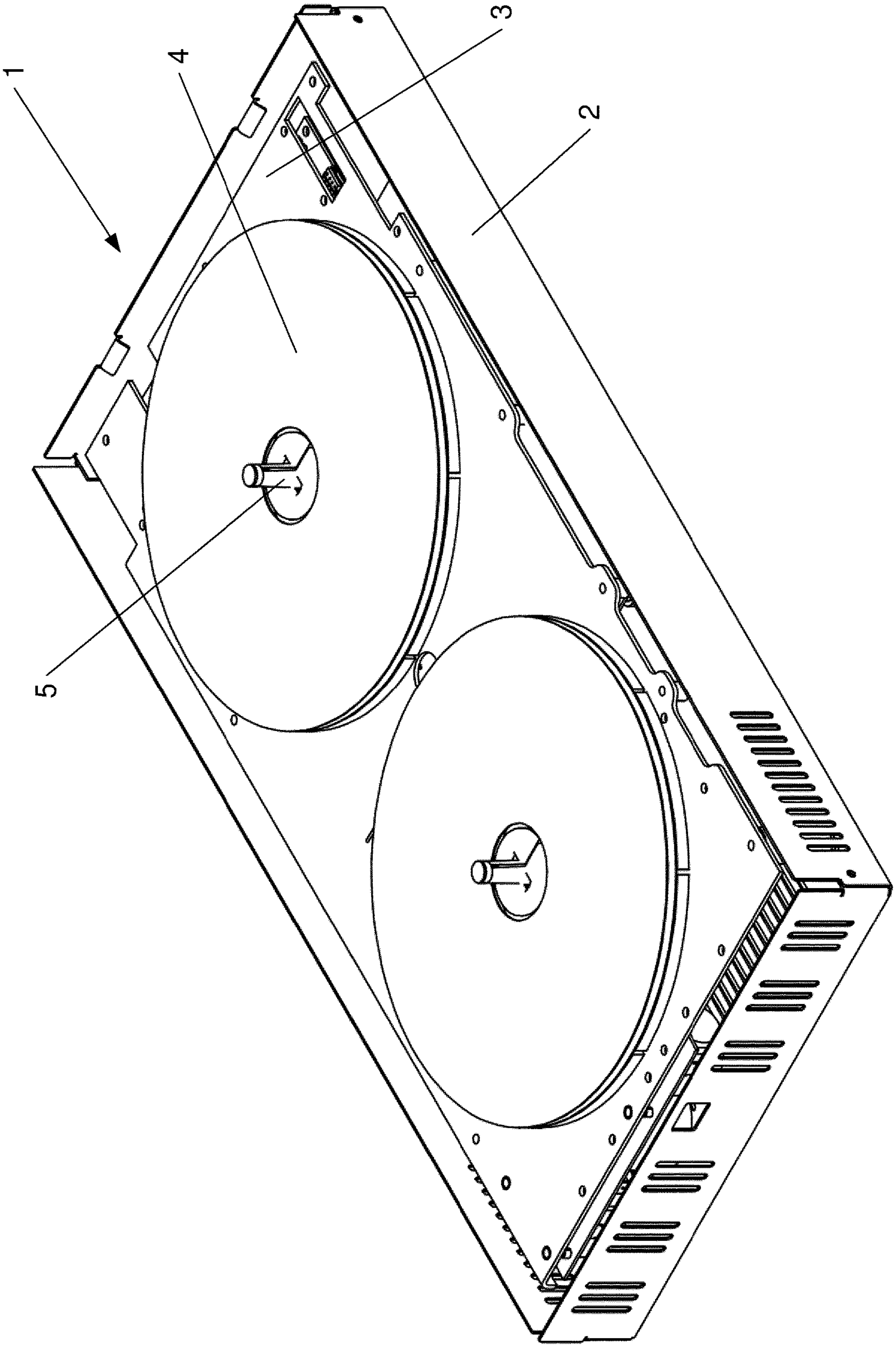
FIG. 1 shows a perspective view of an induction cooking device used in a cooking assembly according to the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes. The terms so used are interchangeable under appropriate circumstances and the embodiments of the invention described herein can operate in other orientations than described or illustrated herein.

Furthermore, the various embodiments, although referred to as “preferred” are to be construed as exemplary manners in which the invention may be implemented rather than as limiting the scope of the invention.

FIG. 1 shows a perspective view of an induction cooking device 1 used in a cooking assembly according to the present invention. The induction cooking device 1 is meant to be attached to the underside of a countertop 6 and is therefore open at its top side. The remaining sides of the induction cooking device 1 are enclosed by a housing 2 in order to protect the components within. Typically, the housing 2 will be attached to the underside of the countertop 6. Within the housing 2, a frame 3 is provided on which the inductor 4 and the temperature sensing system 5 are mounted. The details of both the inductor 4 and the temperature sensing system 5 will be described with reference to FIGS. 2 and 3.

Figure 2A:
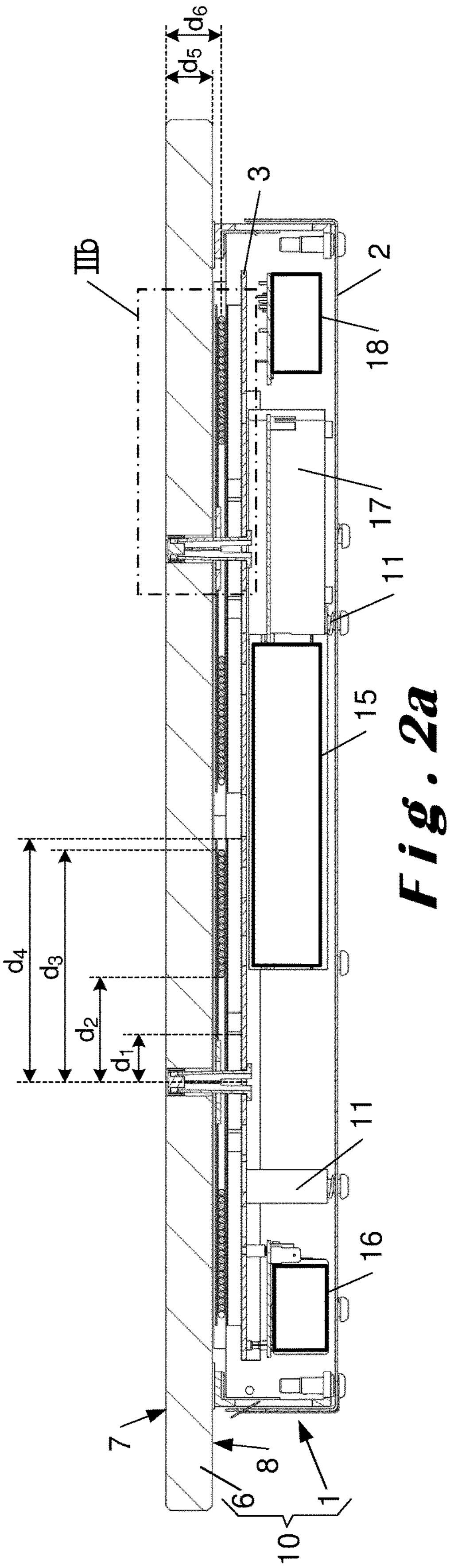
FIG. 2*a* shows a longitudinal cross-section through a cooking assembly according to the present invention.

FIG. 2*a* shows a longitudinal cross-section through a cooking assembly 10 according to the present invention, which assembly comprises a countertop 6 having a top surface 7 and a bottom surface 8 and two through-openings 9 the purpose of which is described below. The cooking assembly 10 further comprises an induction cooking device 1 mounted against the bottom surface 8 of the countertop 6. The induction cooking device 1 is designed in order to supply heating energy to a cooking pot (not shown) to be placed directly on the top surface 7 of the countertop 6.

The countertop 6 is made from a heat resistant material, such as porcelain, ceramic, glass, or a sintered material, such as sintered stone. As used herein, a heat resistant material should be able to withstand a contact temperature (i.e. be in contact with a cooking pot having a temperature) of at least 230° C., preferably at least 240° C., more preferably at least 260° C. and most preferably at least 300° C. This ensures that the countertop can withstand the temperatures typically achieved in common cooking application. This typically excludes composite materials as the resins used therein are unable to withstand temperatures exceeding 180° C. Preferably, the countertop comprises a ceramic material or a sintered material, such as sintered stone.

The countertop 6 has a substantially constant thickness $d_5$, which may be in the order of 10 to 50 mm and is about 20 mm in the illustrated embodiment. In particular, the bottom surface 8 of the countertop 6 is not provided with any recesses or other local thickness variations that would allow to position the inductor 4 closer to the top surface 7 of the countertop 6.

As described above, within the housing 2 of the induction cooking device 1, a frame 3 is provided. This frame 3 is positioned with respect to the housing 2 through the use of various feet 11. In the illustrated embodiment, the frame 3 is formed by a substantially flat plate and forms a division wall between the inductor 4 and the temperature sensing system 5 on the one hand and the various electronical components of the induction cooking device 1 on the other hand. The frame 3 is manufactured from a metal, preferably aluminium. This offers the required rigidity and strength and has a sufficiently low magnetic permeability so as to not significantly affect the operation of the inductor 4.

As shown in FIG. 2*a*, the inductor 4 comprises an induction coil 12 with a magnetic flux concentrator 13 underneath and an insulation layer 14 on top. Likewise, an insulation layer is also shown between the induction coil and the magnetic flux concentrator 13. A generator is connected to the induction coil 12 in order to deliver the required AC current. In the illustrated embodiment, the generator comprises a net filter 16 and an electronic steering module 15 which controls the operation of the inductor 4. The generator provides an AC current to the induction coil 12 having a frequency between 25 and 80 kHz and preferably not exceeding 60 kHz and particularly 50 kHz with the frequency preferably exceeding 30 kHz.

The induction coil 12 is made from a copper-clad aluminium wire, but other materials are possible (such as pure aluminium). The induction coil 12 has an inner diameter $d_2$ and an outer diameter $d_3$. In the illustrated embodiment, the inner diameter $d_2$ is about 90 mm and the outer diameter $d_3$ is about 200 mm, but these values may vary. In general, the inner diameter $d_2$ is at least equal to 40% and is at most equal to 75%, in particular at most 60%, and more in particular at most 50%, of the outer diameter $d_3$. As described above, this provides a good balance between the number of windings and the desired magnetic field strength. The wire is a Litz wire with a non-circular cross-section, in particular a rectangular cross-section, such that adjacent wires can be placed as close to one another as possible. It is beneficial in case the Litz wire is higher than it is wide, but the aspect ratio (e.g. the height to width ratio) may vary in general between 1 and 5, preferably between 1.1 and 4, more preferably between 1.2 and 3, even more preferably between 1.3 and 2, and most preferably between 1.4 and 1.6.

Figure 3:
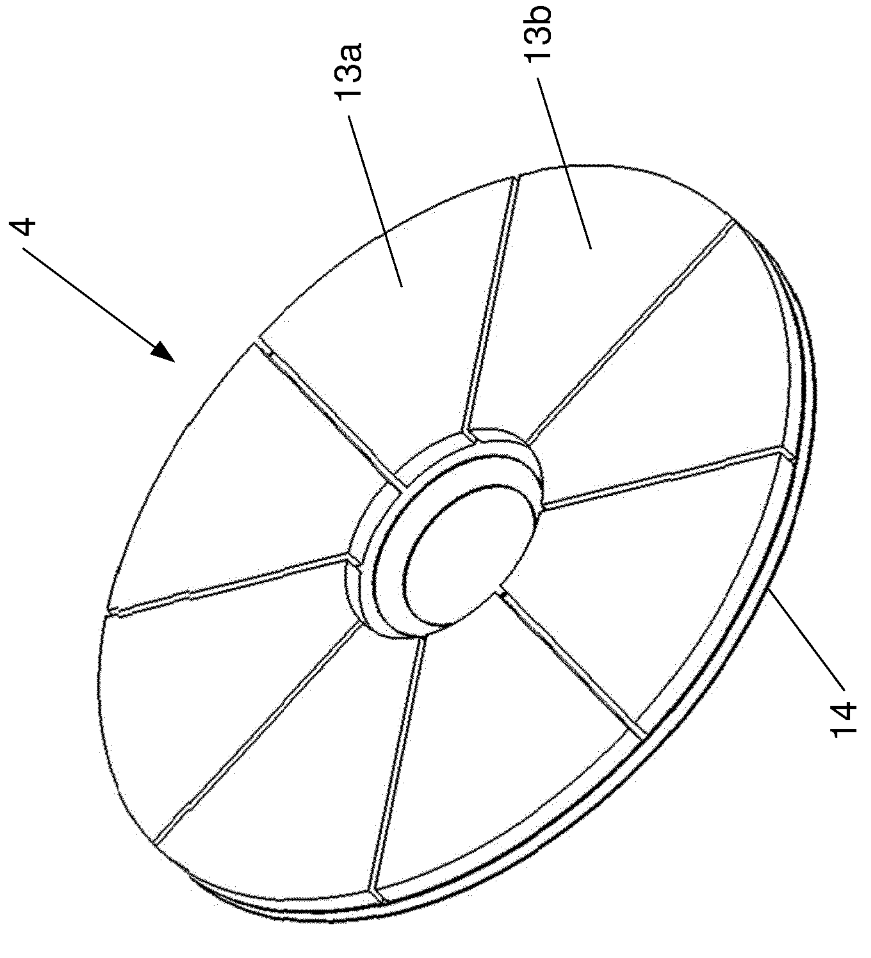
FIG. 3 shows a perspective view of the bottom of the inductor in the induction cooking device used in a cooking assembly according to the present invention.

In the illustrated embodiment, the magnetic flux concentrator 13 covers the whole bottom of the induction coil 12 together with a surrounding area and is best illustrated in FIG. 3. FIG. 3 shows that the magnetic flux concentrator 13 is constructed from multiple (in particular 8) annulus sectors 13*a*, 13*b*, . . . such that the magnetic flux concentrator 13 has an annular shape. The annulus has an inner diameter $d_1$ and an outer diameter $d_4$. In the illustrated embodiment, the inner diameter $d_1$ is about 60 mm and the outer diameter $d_4$ is about 210 mm, but these values may vary. In general, the inner diameter $d_1$ is at least equal to 10%, in particular at least 25%, more in particular at least 40%, and most in particular at least 60%, and is at most equal to 90%, in particular at most 80%, more in particular at most 75%, and most in particular at most 70%, of the inner diameter $d_2$ of the induction coil 12. As described above, completely covering (or at least covering 70%, preferably 80%, and more preferably 90% of the bottom area of) the induction coil 12 and the adjacent area improves the effect of the magnetic flux concentrator 13 by directing more of the generated magnetic field towards the top surface 7 of the countertop 6.

In an alternative embodiment, the magnetic flux concentrator 13 is formed by a disc. This further improves the effect of the magnetic flux concentrator 13 since the inner coil area is now wholly covered. However, it requires a different temperature sensing system 5 since there is no longer an opening through the magnetic flux concentrator 13 to the frame 3. The temperature sensor support 19 may then be glued to the bottom 8 of the countertop 6 or press-fitted or screwed into the opening 9. Naturally other shapes are available to form the magnetic flux concentrator 13, such as a rectangular shape, an oval shape, etc. The specific construction is in part determined by the costs of manufacturing the ferrite elements, in particular in order to avoid a grinding operation.

It will be readily appreciated that the magnetic flux concentrator 13 may also protrude outwards with respect to the coil 12. More specifically, the outer diameter $d_4$ of the magnetic flux concentrator 13 may be at least equal to, preferably larger than, more preferably at least 5% larger than and even more preferably at least 10% larger than the outer diameter $d_3$ of the coil 12.

Various materials are known from which to form the magnetic flux concentrator 13. Soft magnetic materials, preferably a ferrite is used, such as a manganese zinc ferrite.

The insulation sheets are made from mica in the illustrated embodiment and covers both the induction coil 12 and the magnetic flux concentrator 13 in order to electrically insulate and/or to protect the live parts of the induction cooking device from a safety point of view and/or to provide a thermal protection. Depending on the countertop 6, it will be readily appreciated that other materials may be used to form the insulation sheet 14 or that the insulation sheet 14 may be absent. Moreover, varying thicknesses may be used, e.g. between 0.4 to 2 mm.

Additionally, a ventilation unit 17 is provided within the housing 2 in order to cool the interior thereof. There is also provided a control unit 18 that may be used to coordinate between multiple induction cooking devices 1. The control unit 18 may also be used to handle user input/output.

In the illustrated embodiment, the induction cooking device 1 included two inductors 4. It will be readily appreciated that fewer or more inductors 4 may be provided per induction cooking device 1.

As described above, due to the frequency of the AC current, the non-circular cross-section of the induction coil wire, and the magnetic flux concentrator 13 covering at least 50% of the induction coil 12, the induction cooking device 1 according to the present invention is operable to efficiently provide energy to a cooking pot (not shown) with an air gap $d_6$ spanning between 10 and 50 mm, in particular at least 12 mm, more in particular at least 16 mm, and most in particular at least 18 mm and/or in particular at most 40 mm, more in particular at most 30 mm, even more in particular at most 25 mm, and most in particular at most 22 mm. It will be readily appreciated that the term "air gap" refers to the distance between the induction coil 12 (in particular the top thereof) and the cooking surface 7 and does not require actual air to be present between these elements. This is also illustrated in FIGS. 2*a* and 2*b* where the "air gap" is actually filled by a mica layer 14 and a countertop 6.

Figure 2B:
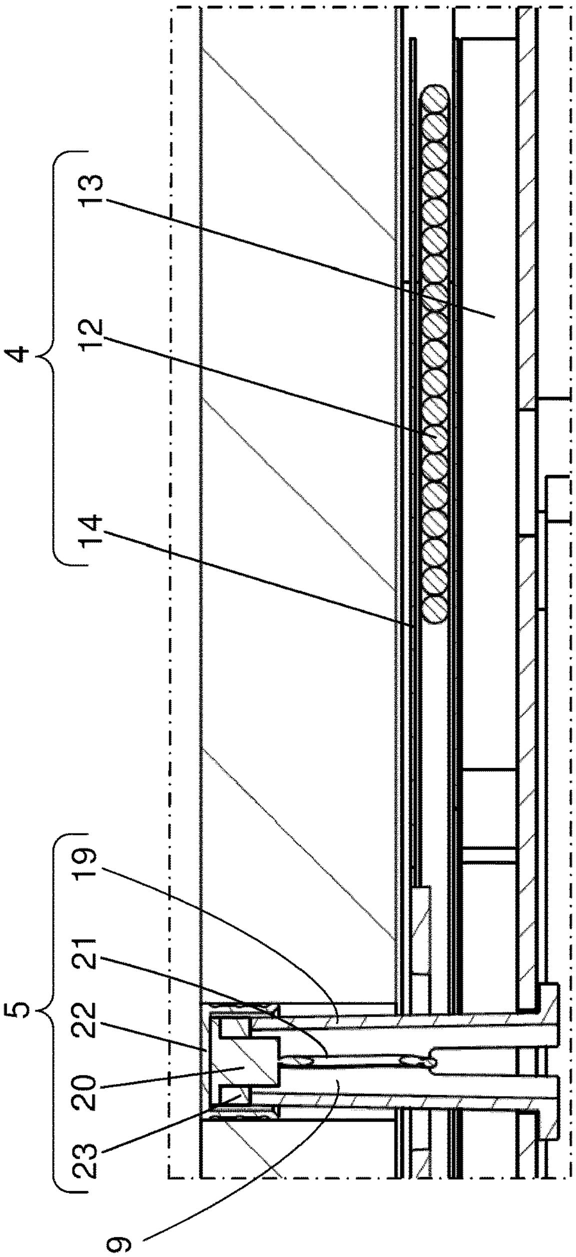
FIG. 2*b* shows a detail of FIG. 2*a*.

The temperature sensing system 5 is also illustrated in FIG. 2*b* and comprises a support 19 which extends through the opening 9 in the countertop 6. The support 19, in particular at is lower end, is fastened to the frame 3, while the upper end of the support 19 is located near the top surface 7 of the countertop 6. Within the support 19, preferably as near to the top surface 7 of the countertop 6 as possible, there is provided a temperature sensor 20 which is connected by a wire 21 to a processor (not shown) which processes the temperature sensor measurements in order to determine the cooking pot temperature. On top of the temperature sensor 20, there is provided a protective cover 22 which, in the illustrated embodiment is flush with the top surface 7 of the countertop 6. In the illustrated embodiment, the cover 22 is formed by a 1 mm thick stainless steel sheet, but other materials and/or thicknesses are available (e.g. aluminium, alum iniumnitride, magnesiumoxide, heat resistant plastic materials, etc.). Ideally, the cover 22 is made from a thermally conducting material in order to minimize any temperature variations between the cooking pot and the cover 22. Moreover, the cover 22 is preferably made from an electrically non-conductive material in order to avoid generation of eddy currents in the cover as this may heat the cover and influence the temperature reading.

Between the temperature sensor 20 and the support 19, there is a resilient element 23 (e.g. a silicone ring or a foam material). The main advantage thereof, as described above, is to allow the cover 22 and/or the temperature sensor 20 to protrude slightly with respect to the top surface 7 of the countertop 6 which allows to compensate for cooking pots having a non-flat bottom surface and/or allows determination of cooking pot weight when a weight sensor is present. Alternatively, when the protective cover 22 is fixed in the countertop (e.g. glued flush with the countertop top surface), the resilient element 23 ensures that the temperature sensor 20 is making a good thermal contact with the protective cover 22. In a non-illustrated embodiment, the resilient element (e.g. a compression spring) is positioned between the support 19 and the frame 3. As described above, such an embodiment is less prone to manufacturing tolerances when compared to a foam or silicone ring resilient element.

Although aspects of the present disclosure have been described with respect to specific embodiments, it will be readily appreciated that these aspects may be implemented in other forms within the scope of the invention as defined by the claims.

The invention claimed is:

1. A cooking assembly comprising a countertop and an induction cooking device to be mounted underneath the countertop, the induction cooking device comprising:

a frame;

an induction coil supported by the frame and having a bottom and a top, the top being oriented towards the countertop and being positioned at a first distance from a top surface of the countertop, the first distance being between 10 and 50 mm, the induction coil being formed from a wire having a uniform non-circular cross-section having a width and a height, the height being larger than the width, said induction coil having an inner diameter and an outer diameter, said inner diameter being at least equal to 40% of said outer diameter;

a generator connected to the induction coil and configured to supply an AC current to the induction coil, the AC current having a frequency between 25 and 80 KHz; and a magnetic flux concentrator disposed between the frame and the bottom of the induction coil, the magnetic flux concentrator covering at least 50% of the bottom of the induction coil and having a relative magnetic permeability of at least 1000.

2. The cooking assembly according to claim 1, wherein said inner diameter is at most equal to 75%, particularly at most 60%, and more particularly at most 50%, of said outer diameter.

3. The cooking assembly according to claim 1, wherein the magnetic flux concentrator covers at least 70%, particularly at least 80%, and more particularly at least 90%, of the bottom of the induction coil, the magnetic flux concentrator preferably covering the entire bottom of the induction coil.

4. The cooking assembly according to claim 1, wherein the magnetic flux concentrator has a relative magnetic permeability of at least 1600, particularly at least 2100, more particularly at least 2400, and most particularly at least 2600.

5. The cooking assembly according to claim 1, wherein the magnetic flux concentrator is formed by:

a flat disc which is preferably formed from a plurality of circle sectors; or a flat annulus which is preferably formed from a plurality of annulus sectors, wherein, preferably, an inner diameter of said annulus is at most equal to the inner diameter of the induction coil and an outer diameter of said annulus is at least equal to the outer diameter of the induction coil, and wherein, more preferably, the inner diameter of said annulus is at least equal to 10% in particular at least 25%, more in particular at least 40%, and most in particular at least 60%, of the inner diameter of the induction coil, and is at most equal to 90%, in particular at most 80%, more in particular at most 75%, and most in particular at most 70%, of the inner diameter of the induction coil.

6. The cooking assembly according to claim 1, wherein the magnetic flux concentrator comprises a soft magnetic material, preferably a ferrite.

7. The cooking assembly according to claim 1, wherein the AC current has a frequency of at most 60 KHz and particularly at most 50 KHz and/or at least 30 KHz.

8. The cooking assembly according to claim 1, wherein the induction cooking device further comprises an insulating sheet disposed on top of the induction coil and/or a further insulating sheet disposed on the bottom of the induction coil, wherein, preferably, the insulating sheet and/or the further insulating sheet covers the induction coil and more preferably also covers the magnetic flux concentrator, wherein, preferably, the insulating sheet and/or the further insulating sheet comprises mica.

9. The cooking assembly according to claim 1, wherein the first distance is at least 12 mm, in particular at least 16 mm, and more in particular at least 18 mm, and/or wherein the first distance is at most 40 mm, in particular at most 30 mm, more in particular at most 25 mm, and most in particular at most 22 mm.

10. The cooking assembly according to claim 1, wherein the countertop has a nearly constant thickness and/or wherein the countertop comprises a heat resistant material, such as porcelain, ceramic, glass, or a sintered material.

11. The cooking assembly according to claim 1, wherein the induction cooking device further comprises a temperature sensing system configured to sense a temperature of a cooking pot positioned on the countertop, the temperature sensing system comprising:

an opening extending through the countertop;

a support having a proximal end and a distal end and extending through said opening, the distal end being near a top surface of the countertop; and a temperature sensor positioned near the distal end of the support.

12. The cooking assembly according to claim 11, wherein the proximal end is supported by the frame or wherein the proximal end is connected to the bottom surface of the countertop or wherein the support is glued, screwed and/or press fitted into the opening.

13. The cooking assembly according to claim 11, wherein the temperature sensing system further comprises a cover disposed on the distal end of the support and covering the temperature sensor, wherein, preferably, the cover at least partly protrudes with respect to the top surface of the countertop.

14. The cooking assembly according to claim 13, wherein a distance between the top of the induction coil and the distal end of the support is the same as said first distance.

* * * * *